June 22, 1965  M. FELDMAN  3,191,002
ELECTRODE-HOLDING DEVICE FOR ELECTRIC-ARC WELDING
Filed Nov. 19, 1962  2 Sheets-Sheet 1
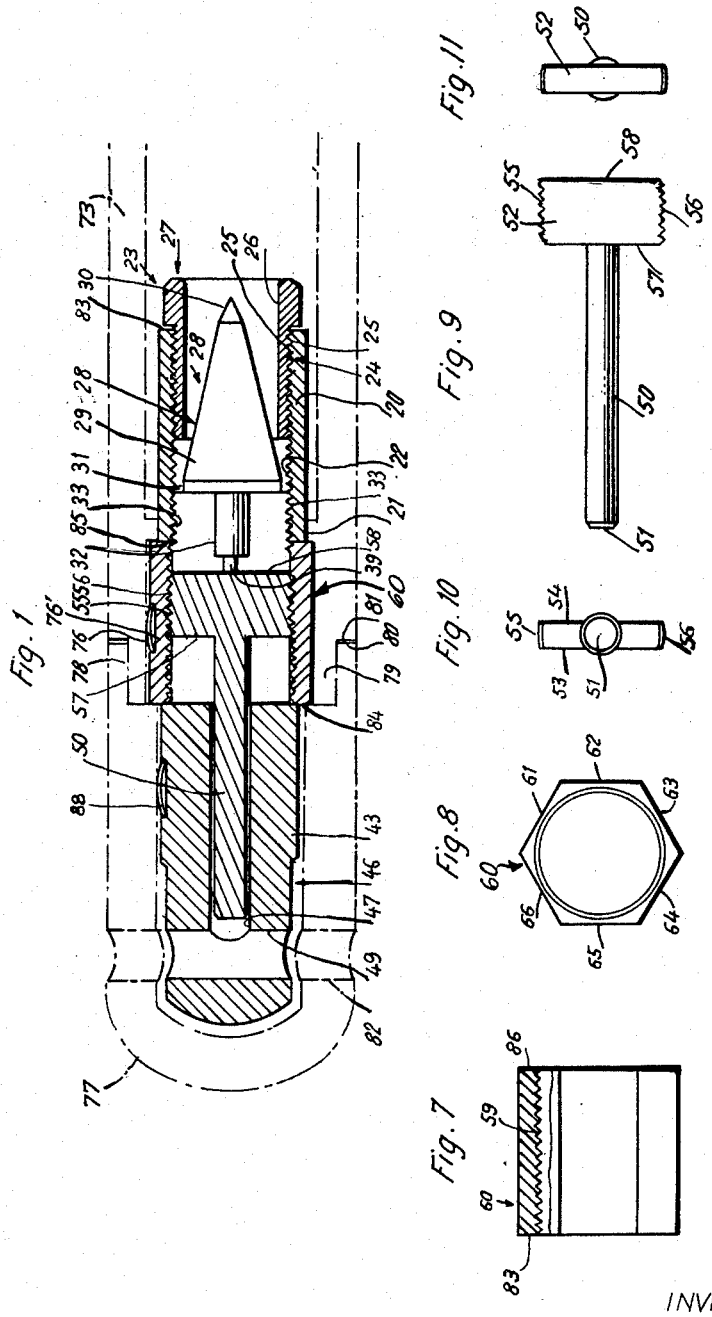
INVENTOR
Michel Feldman
BY
Karl F. Ross
AGENT

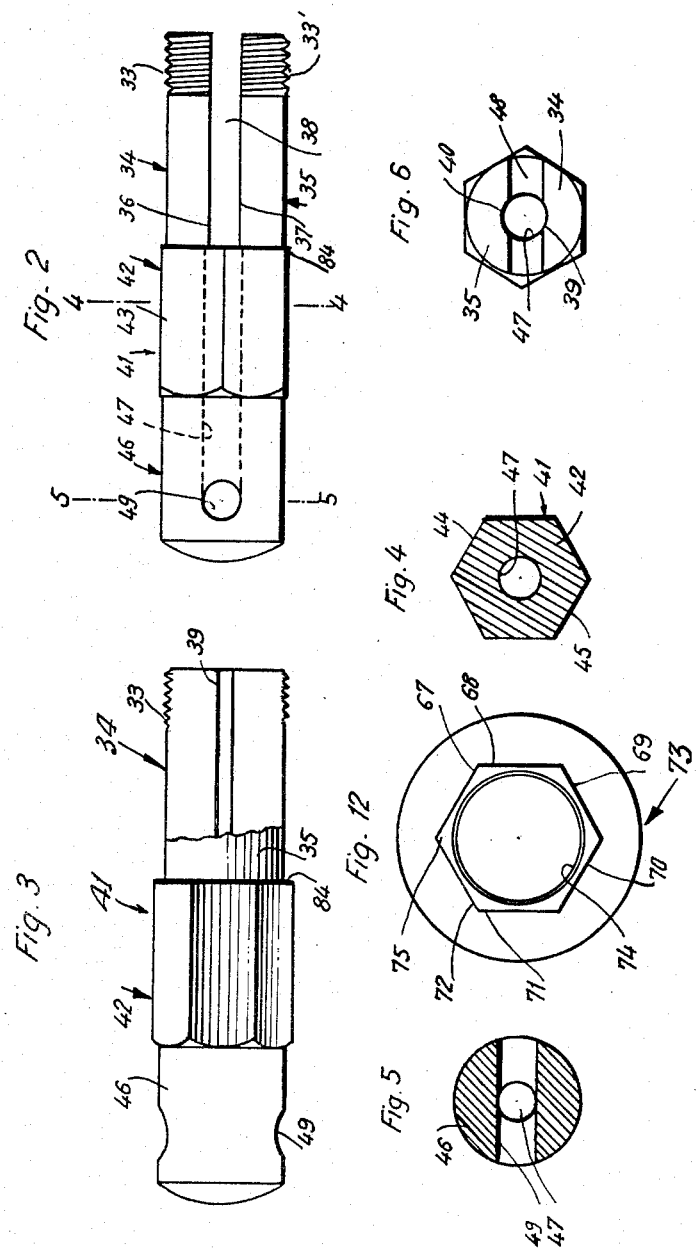

United States Patent Office 3,191,002
Patented June 22, 1965

3,191,002
ELECTRODE-HOLDING DEVICE FOR
ELECTRIC-ARC WELDING
Michel Feldman, 3 Rue Lalande, Paris 14, France
Filed Nov. 19, 1962, Ser. No. 238,653
Claims priority, application France, Sept. 5, 1962,
908,690
8 Claims. (Cl. 219—142)

The present invention relates to an electrode-holding device for electric-arc welding.

One object of the invention is to provide an electrode-holding device which serves to ensure that the conduction of current of high intensity between the supply cable and the electrode takes place under the most effective conditions.

Another object of the invention is to provide a device of this type in which the fitting and removal of the electrode are carried out easily and rapidly and without resulting in any wear, even after a large number of manipulations.

Yet another object of the invention is to provide a device of this type which provides the welding operator with optimum protection.

Again another object of the invention is to provide a device of this type which is both easy to manufacture and simple to assemble.

A further object of the invention is to provide a device of this type which cannot be too readily taken apart or exposed to the risk of damage in the hands of an unskilled workman.

Still a further object of the invention is to provide a device of this type in which the insulating portions, namely the handle on the one hand and the head on the other hand, always provide the same continuity of protection.

Yet a further object of the invention is to provide a device in which the fitting and removal of the electrode does not produce any stress on the current-supply cable.

In the description which follows below and which is given by way of example, reference is made to the accompanying drawing in which:

FIG. 1 is a general view of the device in longitudinal cross-section, the current-supply cable and the electrode having been omitted from the figure for the sake of clarity;

FIG. 2 is a view in elevation of the current conduction member;

FIG. 3 is a view which is similar to FIG. 2 but in a plane at right angles to this latter with a portion broken away;

FIG. 4 is a view in cross-section taken along the line 4—4 of FIG. 2;

FIG. 5 is a view in cross-section taken along the line 5—5 of FIG. 2;

FIG. 6 is a view looking on the rear end of the conduction member shown in FIG. 2;

FIG. 7 is a fragmentary sectional view in elevation of a sleeve;

FIG. 8 is an end view of the sleeve shown in FIG. 7;

FIG. 9 is a view in elevation of an electrode clamping member;

FIG. 10 is a view of said electrode clamping member looking on the front end;

FIG. 11 is a view of said electrode clamping member looking on the rear end; and FIG. 12 is a view of an insulating hand-grip looking on the front end.

The device comprises a bush 20 (as shown in FIG. 1) of copper or copper alloy, the external surface 21 of which is smooth and the internal surface 22 of which is tapped over the entire length thereof.

In the interior of said bush and at the rear end thereof, there is fitted a tubular nut 23 having a body 24 with a threaded external surface 25 and a smooth internal surface 26 as well as a head 27 of polygonal (e.g. hexagonal) profile which facilitates its operation. There is housed in the interior of the bush 20 and of the tubular nut 23 a tail-piece 28 having a body 29 of conical shape while the rear end 30 thereof which is also of conical shape is inclined at a more oblique angle than the body proper, the front portion of said body terminating in a cylindrical portion 31 and having an extension in the form of a tubular appendage 32.

The frontal portion of the internal screw-thread 22 is adapted to cooperate with the threads 33 and 33' (as shown in FIGS. 2 and 3) which are cut in the rear ends of two arms 34 and 35 which each have the shape of a cylindrical segment and are derived as a result of machining from a cylindrical body, so that the flat parallel faces 36 and 37 define a space 38 whose height is substantially equal to the height of the arms 34 and 35 (as shown in FIG. 6). The faces 36 and 37 are hollowed out in the shape of a cylindrical channel as respectively shown at 39 and 40. The arms 34 and 35 form one piece with a monobloc member 41 of copper or copper allow which is provided in addition to said arms with a solid body 42 where external face 43 has the shape of a hexagonal prism, the distance between two opposite faces, for instance between the face 44 and the face 45 (as shown in FIG. 4), being slightly greater than the diameter of the cylinder from which are derived the arms 34 and 35. A cylindrical head 46 extends from the body 42 and has the same diameter as the cylinder from which are derived the arms 34 and 35, while a bore 47 passes axially through the body 42 and through the head 46; one end of said bore opens onto the rear face 48 (shown in FIG. 6) of the body 42 while the other end communicates with a cylindrical bore 49 (as shown in FIG. 5) which passes through the head 46 from one side to the other and at right angles to the axis of this latter for the purpose of inserting a welding electrode therein.

There is slidably mounted inside the cylindrical bore 47 a smooth rod 50 (as shown in FIGS. 9 to 11), the free extremity 51 of which is flat and which is integral with a small plate 52 of parallelepipedal shape whose large faces are designated by the references 53 and 54; the faces 55 and 56—which are at right angles to the faces 53 and 54, to the face 57 from which the rod 50 originates, and to the face 58 which is parallel to the face 57—are cylindrical and threaded in such manner as to be capable of co-operating with the internal screw thread 59 (see FIG. 7) of a sleeve 60 whose external faces 61–66 (as shown in FIG. 8) form a hexagonal prism. The faces 61–67 are adapted to co-operate in a sliding fit with corresponding prismatic faces 67–72 (shown in FIG. 12) which are formed in the front end of an insulating hand-grip 73 and the junction of said faces with the internal cylindrical surface 74 provides abutment shoulders 75. Elastic friction means which are shown diagrammatically by a spring blade 76 housed in a recess 76' of the sleeve ensure satisfactory locking in position. The body 42 and the head 46 are housed in the interior of an insulating head 77, whose rear portion 78 of smaller thickness co-operates with a collar 79 formed on the front portion of the sleeve 73 for the purpose of relative centering, while the rear annular face 80 of said insulating head is in contact or almost in contact with a shoulder 81 of the sleeve 73. A passage 82 is formed in the head 77 so as to enable the insertion of an electrode.

When carrying out the assembly operation, a current-supply cable is brought in at the rear end of the device in the usual manner. Thus, after the insulating handle 73 has been slipped over the free end of the cable, the leads thereof are untwisted over a short length and then stripped, the tubular nut 23 having previously been fitted over said leads, the strands being then disposed around the conical tail-piece 28; tightening of the contact is achieved in known manner by causing the tubular nut 23 to progress as a result of the co-operation of the external screw-thread 25 with the internal screw-thread 22 and the bush 20. In addition, the plate 52 is brought opposite the opening formed by the sleeve 60. The said plate is introduced inside said sleeve as a result of the co-operation of the screw-threads 55 and 56 with the internal screw-thread 59. The sleeve 60 is positioned at the rear end of the member 41 and is fitted over this latter until the frontal face 83 of said sleeve comes into abutment with the annular shoulder 84 which is formed at the point of junction between the body 42 and the arms 34 and 35. During this fitting operation, the rod 50 penetrates inside the bore 47. The bush 20 is then brought opposite the rear portion of the member 41 and is screwed on to this latter, while the internal screw-thread 22 co-operates with the screw-threads 33 and 33′ which are cut on the arms 34 and 35. The diameter of the internal screw-thread 22 and the diameter of the screw-threads 33 and 33′ are such that the progression of the bush along the arms 34 and 35 draws these arms closer together as a result of the elasticity with which they are endowed at the point of junction between said arms and the body 42, with the result that, once the bush has reached the final position thereof which corresponds to the completion of the screwing operation, the said bush can no longer be moved backwards, or at least not without special tools, thereby preventing any untimely or accidental disassembly of the device. The drawing-together of the arms 34 and 35 results in the clamping of the appendage 32 against the channels 39 and 40. The final position of the bush 20 corresponds to the movement of the frontal face 85 thereof opposite to, and in immediate proximity to, the rear face 86 of the sleeve 60. The insulating handle 73 is then displaced along the cable and along the bush 20 until its hexagonal cavity finally covers the sleeve 60, which is provided externally with corresponding hexagonal sides, and the final position is ensured both by means of the abutment of the rear rim 86 of the sleeve against the shoulders 75 and by means of the flexible strip 76. The insulating head 77 is then fitted over the body 42 and the head 46 until the portion 78 of said insulating head finally passes over the collar 79, the position of said insulating head being maintained with respect to the body 42 and with respect to the head 46 by means of a friction device comprising a flexible strip 88; the bore 49 is aligned with the orifice or orifices 82 which are provided in the insulating head.

In order to fit and remove an electrode by means of the electrode-holding device in accordance with the invention, it is merely necessary to cause the insulating handle 73 to rotate with respect to the insulating head 77. The rotation of the insulating handle results in the rotation of the sleeve 60, the external hexagonal sides of which co-operate with the hexagonal cavity of said sleeve. As it rotates, the said sleeve is secured against longitudinal motion as a result of the contact of the frontal face 83 of said sleeve with the annular shoulder 84 of the body 42 and the abutment of the rear face 86 of said sleeve against the frontal face 35 of the bush 20 and accordingly causes the plate 52 which is housed in the space 38 of member 41 to move either forward or backward as a result of the co-operation of the internal screw-thread 59 of said sleeve with the screw-threads 55 and 56, the plate 52 being consequently unable to rotate. Upon relative rotation of the internally hexagonally profiled members 73 and 77 in one direction, the plate 52 and consequently the rod 50 which is integral with said plate both progress in one direction, for example forwards, while upon opposite rotation, the sliding motion of the rod 50 takes place in the other direction. The frontal face 51 of the rod 50 can thus be brought by clamping under pressure against an electrode which has previously been fitted inside the orifice 82 and the bore 49 or alternatively said frontal face of the rod can be moved away from said electrode. The movement of the rod 50 is a pure translational movement without rotation, which thus prevents any wear of the frontal face 51 and consequently any "mushrooming." The direction of the internal screw-thread 59 and of the external screw-threads 55 and 56 is chosen in such manner as to ensure that the application of the end of the electrode against the worpiece to be welded has a tendency to increase the pressure of application of the frontal face 51 of the rod 50 against said electrode.

During the clamping and releasing of the electrode as a result of the relative rotation of the insulating handle 73 and of the insulating head 77, the longitudinal positions of said handle and of said insulating head remain unchanged, with the result that the overlapping between the portion 78 of the head and the collar 79 remains effective.

What I claim is:

1. An arc welding electrode-holder comprising an elongated conductive body provided at one end thereof with a transverse bore for fitting an electrode therein, said body being further provided with a longitudinal passage opening into said bore, said body terminating at the end opposite said bore in two parallel arms of segmental cross-section forming therebetween a space constituting an extension of said passage, an electrode-clamping member comprising a rod slidably fitted in said passage and a plate which is transverse with respect to said rod and which is provided with a screw-thread on those edges which are parallel to said rod, an internally-threaded bush co-operating with the screw-threads of said plate, said internally-threaded bush surrounding said arms and, means for securing said internally-threaded bush against longitudinal motion so that as a result of the rotation of said bush said rod comes into contact under pressure with the electrode in a purely longitudinal movement by reason of the guiding of said plate between said arms.

2. An arc welding electrode-holder comprising an elongated body of conductive material for clamping an electrode, said body having a transverse bore for fitting the electrode therein, said body being further provided with a longitudinal passage opening into said bore in the rear wall of the latter, two arms of segmental cross-section forming an extension of said body and providing therebetween a space into which said passage opens, an annular shoulder being formed between said body and said arms, said arms being threaded at the rear ends thereof which are opposite said annular shoulder, a member capable of clamping the electrode under pressure and comprising a push-rod slidably fitted in said passage and a plate forming an extension at the rear end of said rod, those sides of said plate which are parallel to said push-rod being threaded, an internally-threaded sleeve adapted to co-operate with the threaded portions of said arms and an internally-threaded bush adapted to co-operate with said threaded sides of said plate and secured against longitudinal motion by being brought into abutment on the one hand with the frontal rim of the sleeve and on the other hand with said annular shoulder.

3. An arc-welding electrode-holder as claimed in claim 2, in which the opposite faces of said arms defining said space are provided with hollowed-out cylindrical channels designed to receive said push-rod.

4. An arc-welding electrode-holder as claimed in claim 3, additionally comprising a member which is designed for the purpose of clamping the strands of a current supply cable and which consists of a cylindrical tail-piece housed in said hollowed-out channels.

5. An arc-welding electrode-holder as claimed in claim 2, comprising a covering head of insulating material surrounding said body and means for securing said covering head with respect to said body both against movement of rotation and against longitudinal sliding movement.

6. An arc-welding electrode-holder as claimed in claim 2, comprising a covering head of insulating material surrounding said body and means for securing said covering head with respect to said body both against movement of rotation and against longitudinal sliding movement, said head being provided with a shoulder which is adapted to co-operate with a frontal face of said bush.

7. An arc-welding electrode-holder as claimed in claim 2, additionally comprising a hand-grip of insulating material which covers the sleeve and the bush, means being provided for securing said hand-grip with respect to the bush both against movement of rotation and against longitudinal sliding movement.

8. An arc-welding electrode-holder consisting of an elongated electrode support of conductive material comprising a body, said body having an end provided with a transverse bore for slidably fitting an electrode therein, said body further having a longitudinal passage opening into said bore, said body having over one portion of its length an external transverse section with polygon sides, two longitudinal arms extending from said body, said arms forming with said body an annular shoulder and defining therebetween a transverse space, the opposite faces of said arms each having a hollowed-out channel, the rear ends of said arms being threaded, a member capable of clamping the electrode under pressure and comprising a rod slidably fitted in said passage and in said hollowed-out channels and a plate rigid with said rod housed in said space, screw-threads being cut in the sides of said plate, an internally-threaded sleeve adapted to co-operate with the threaded portions of said arms, an internally-threaded bush adapted to co-operate with the screw-threads of said plate and having annular frontal faces respectively in abutment with said annular shoulder and with a frontal face of said sleeve, a conical member in the interior of said sleeve adapted to engage the strands of an electric current-supply cable and comprising a cylindrical tailpiece housed in said hollowed-out channels, a plug having a threaded portion which co-operates with the internal screw-thread of said sleeve and by means of which said plug works conjointly with said conical member for clamping said cable strands, the outer periphery of said bush being polygon-sided, a head of insulating material adapted to cover said body formed with an internal peripheral profile which corresponds to the sides of said body, a hand-grip of insulating material adapted to cover said sleeve and said bush and formed with an internal profile having a section which corresponds to the polygon-sided section of said bush, with the result that by relative rotation of the insulating head and the hand-grip said rod is applied under pressure against said electrode or is moved away from said electrode depending upon the sense of rotation.

References Cited by the Examiner
UNITED STATES PATENTS

| | | | |
|---|---|---|---|
| 1,908,007 | 5/33 | Bende | 219—142 |
| 2,277,298 | 3/42 | Carbis | 219—142 |

RICHARD M. WOOD, *Primary Examiner.*